(12) United States Patent  
Sakamoto et al.

(10) Patent No.: US 7,465,082 B2
(45) Date of Patent: Dec. 16, 2008

(54) PLANAR LIGHT-SOURCE DEVICE

(75) Inventors: Takuya Sakamoto, Goshi (JP); Akihiro Mori, Goshi (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 235 days.

(21) Appl. No.: 11/404,848

(22) Filed: Apr. 17, 2006

(65) Prior Publication Data

US 2006/0245208 A1    Nov. 2, 2006

(30) Foreign Application Priority Data

Apr. 27, 2005  (JP)  ............................. 2005-129631
Feb. 15, 2006  (JP)  ............................. 2006-037719

(51) Int. Cl.
*F21V 33/00*    (2006.01)

(52) U.S. Cl. ...................... 362/609; 362/330; 362/346; 362/612; 362/560; 362/297

(58) Field of Classification Search ......... 362/600–634, 362/559–561, 300, 307, 327–329, 223–225, 362/241, 245, 247, 296, 297, 341, 346, 800; 349/66, 67

See application file for complete search history.

(56) References Cited

U.S. PATENT DOCUMENTS

| 7,201,488 B2* | 4/2007 | Sakamoto et al. ........... 362/561 |
| 7,229,198 B2* | 6/2007 | Sakai et al. ................. 362/560 |
| 7,333,249 B2* | 2/2008 | Sawada ....................... 362/610 |
| 2004/0218388 A1 | 11/2004 | Suzuki |
| 2005/0088586 A1 | 4/2005 | Mori et al. |
| 2006/0181901 A1* | 8/2006 | Sakai et al. ................. 362/613 |
| 2006/0245208 A1 | 11/2006 | Sakamoto et al. |

FOREIGN PATENT DOCUMENTS

| CN | 1534339 A | 10/2004 |
| JP | 60-163141 | 10/1985 |
| JP | 2002-107721 | 4/2002 |
| JP | 2004-31064 | 1/2004 |
| JP | 2004-47297 | 2/2004 |
| JP | 2004-55160 | 2/2004 |
| JP | 2004-319458 | 11/2004 |

OTHER PUBLICATIONS

U.S. Appl. No. 11/940,592, filed Nov. 15, 2007, Mori.

* cited by examiner

*Primary Examiner*—Bao Q Truong
(74) *Attorney, Agent, or Firm*—Oblon, Spivak, McClelland, Maier & Neustadt, P.C.

(57) ABSTRACT

A planar light-source device is obtained in which, in the space between a point light source and the peripheral portion of a through-hole in a case, rays that leak into or are absorbed into a space outside a hollow region can be reduced, whereby the number of rays that propagate into the hollow region can be increased. A point light source is installed from outside a case, through through-holes formed in the case and a reflection sheet, and a reflector formed on the reflection sheet to correspond to the point light source is slanted with respect to the bottom side of the case, depthward along the through-hole, in a region enclosed by the peripheral portion of the through-hole of the case and by the point light source.

16 Claims, 11 Drawing Sheets

FIG 4
(a)
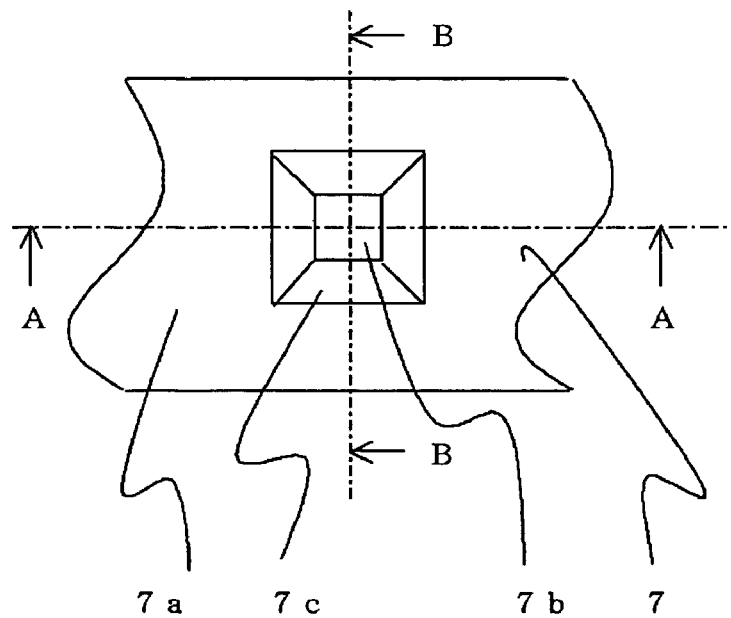
7a  7c      7b  7
(b)
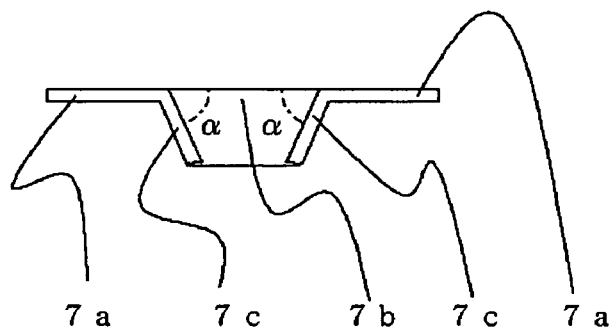
7a   7c   7b   7c   7a
(c)
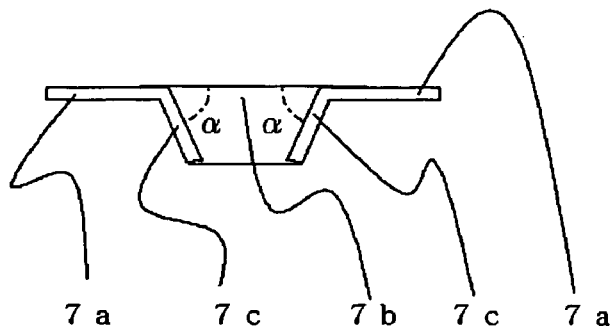
7a   7c   7b   7c   7a FIG 5
(a)
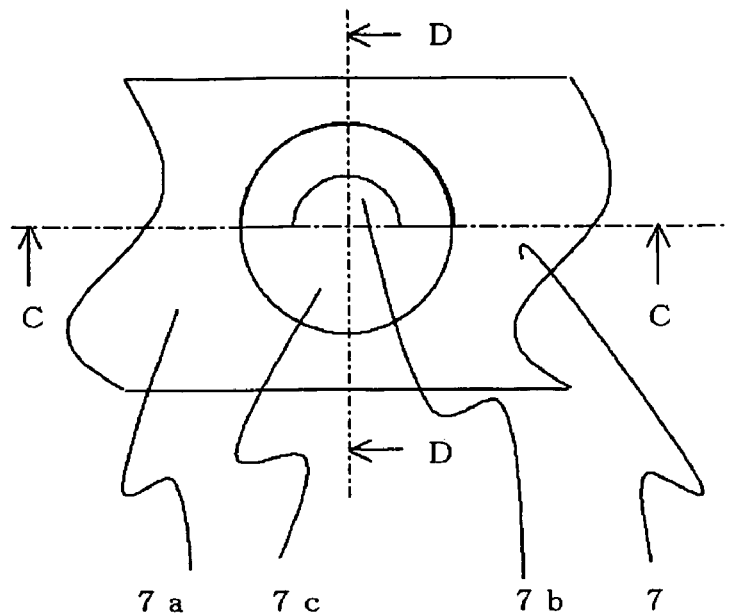
7a  7c       7b   7
(b)
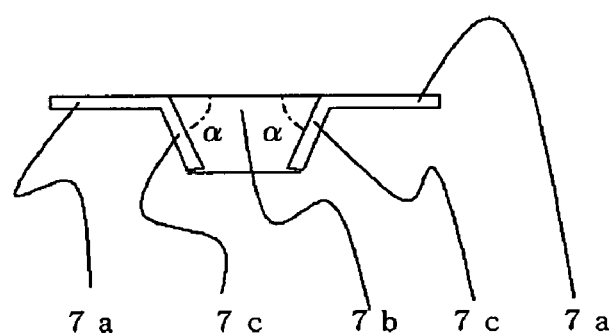
7a   7c   7b   7c   7a
(c)
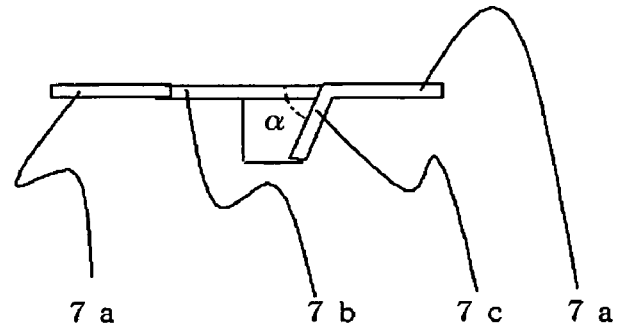
7a      7b   7c   7a FIG 6
(a)
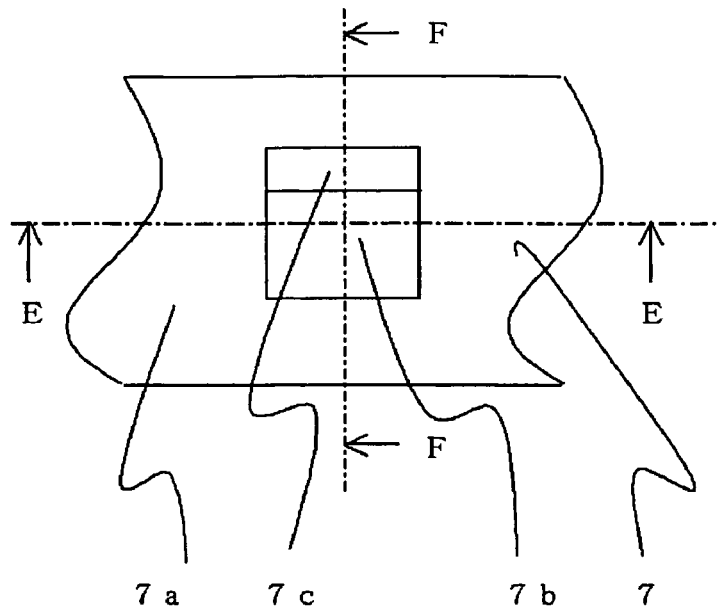
7a  7c  7b  7
(b)
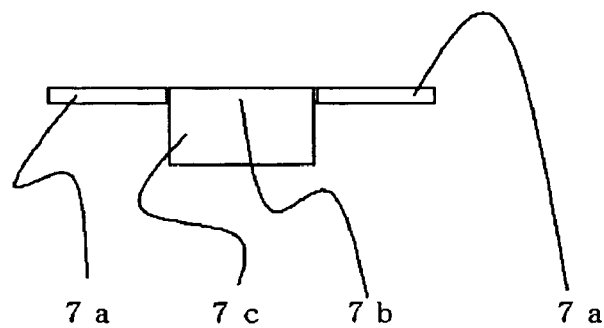
7a  7c  7b  7a
(c)
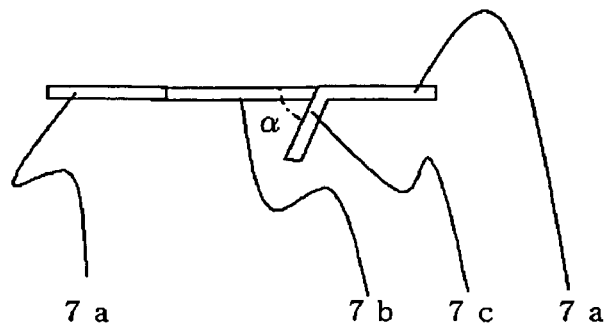
7a  7b  7c  7a FIG 7
(a)
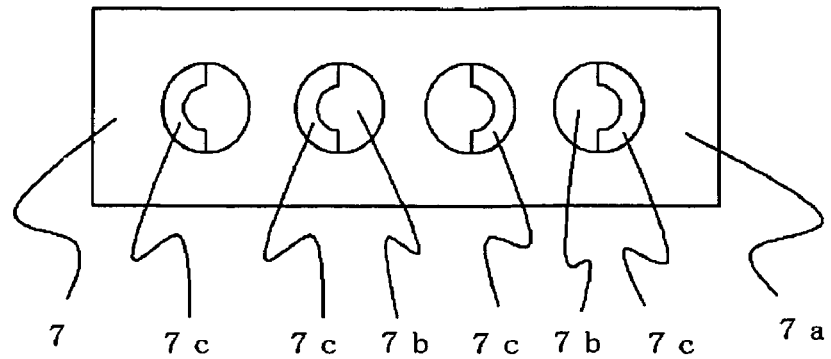
(b)
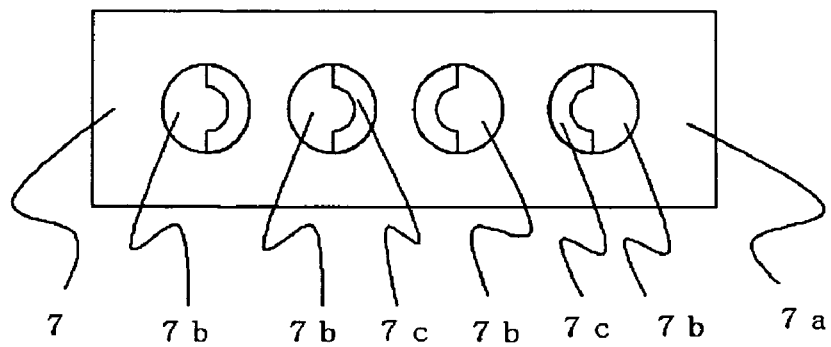
(c)
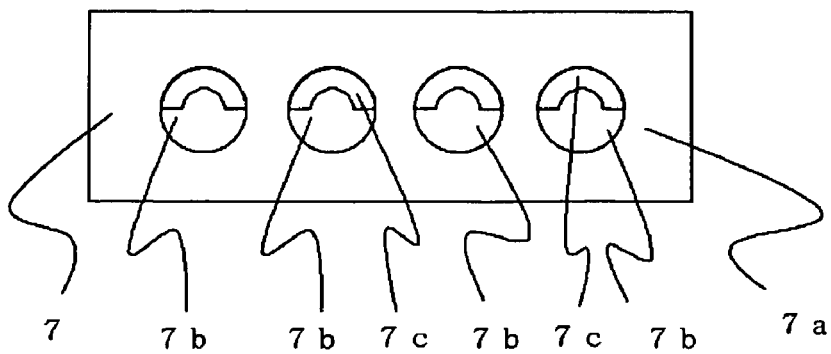

PLANAR LIGHT-SOURCE DEVICE

BACKGROUND OF THE INVENTION

1. Field of the Invention

The present invention relates to a planar light-source device having a reflector for efficiently guiding light from a point light source into a case.

2. Description of the Prior Art

In a conventional planar light-source device, by making part of the light-source side of a light-source substrate having light sources facing a transverse end face of a light guide plate that is provided on the rear side of a liquid-crystal display panel contact the rear side of the light guide plate, and making the side, opposite to the light-source side, of the light-source substrate contact a substrate support portion of a case, the light-source substrate is interposed between the light guide plate and the substrate support portion (e.g., refer to Japanese Laid-Open Patent No. 2002-107721, p 3, 20th line in left column to 34th line in left column and FIG. 1).

SUMMARY OF THE INVENTION

In the conventional planar light-source device disclosed in Japanese Laid-Open Patent No. 2002-107721, in the case where the light-source substrate is detached from or attached to the liquid crystal display module, work is required in which the liquid-crystal display panel and the light guide plate are removed from the case. In other words, the liquid crystal display module itself is required to be disassembled after the liquid crystal display module is removed from a product as a final configuration. Accordingly, it has been a problem that, in the case where replacement of the light-source substrate is required, disassembly work and reassembly work of the liquid crystal display module are necessary, and when the liquid crystal display module is disassembled or reassembled, entry of foreign materials into the display area or occurrence of a scratch deteriorates the display performance.

The present invention has been implemented in order to cope with the problem discussed above, and its object is to provide a planar light-source device, utilizing point light sources, in which the point light sources can readily be replaced, and the replacement work does not result in deterioration of the display quality.

In a planar light-source device according to the present invention, a point light source is installed from outside a case, through through-holes formed in the case and a reflection sheet, and a reflector formed on the reflection sheet to correspond to the point light source is slanted with respect to the bottom side of the case, depthward along the through-hole, in a region enclosed by the peripheral portion of the through-hole and by the point light source.

In the present invention, a point light source is installed from outside a case, through through-holes formed in the case and a reflection sheet, and a reflector formed on the reflection sheet to correspond to the point light source is slanted with respect to the bottom side of the case, depthward along the through-hole, in a region enclosed by the peripheral portion of the through-hole and by the point light source; therefore, without disassembling the planar light-source device, the point light source can be detached and attached, and a planar light-source device can be obtained in which loss of rays emitted by a point light source is reduced, whereby light-utilization efficiency is raised.

BRIEF DESCRIPTION OF THE DRAWINGS

FIG. 4 is a set of views illustrating another shape of the oblique portion of a reflector; FIG. 4(a) is a plan view; FIG. 4(b) is a partial cross-sectional view, taken along the line A-A indicated by the arrows, of the oblique portion illustrated in FIG. 4(a); FIG. 4(c) is a partial cross-sectional view, taken along the line B-B indicated by the arrows, of the oblique portion illustrated in FIG. 4(a);

FIG. 5 is a set of views illustrating another shape of the oblique portion of a reflector; FIG. 5(a) is a plan view; FIG. 5(b) is a partial cross-sectional view, taken along the line C-C indicated by the arrows, of the oblique portion illustrated in FIG. 5(a); FIG. 5(c) is a partial cross-sectional view, taken along the line D-D indicated by the arrows, of the oblique portion illustrated in FIG. 5(a);

FIG. 6 is a set of views illustrating another shape of the oblique portion of a reflector; FIG. 6(a) is a plan view; FIG. 6(b) is a partial cross-sectional view, taken along the line E-E indicated by the arrows, of the oblique portion illustrated in FIG. 6(a); FIG. 6(c) is a partial cross-sectional view, taken along the line F-F indicated by the arrows, of the oblique portion illustrated in FIG. 6(a);

FIG. 7 is a set of views illustrating examples of reflectors; FIG. 7(a) is a plan view illustrating an example of a reflector; FIG. 7(b) is a plan view illustrating another example of a reflector; FIG. 7(c) is a plan view illustrating further another example of a reflector;

DETAILED DESCRIPTION OF THE PREFERRED EMBODIMENTS

Embodiment 1

Figure 1:
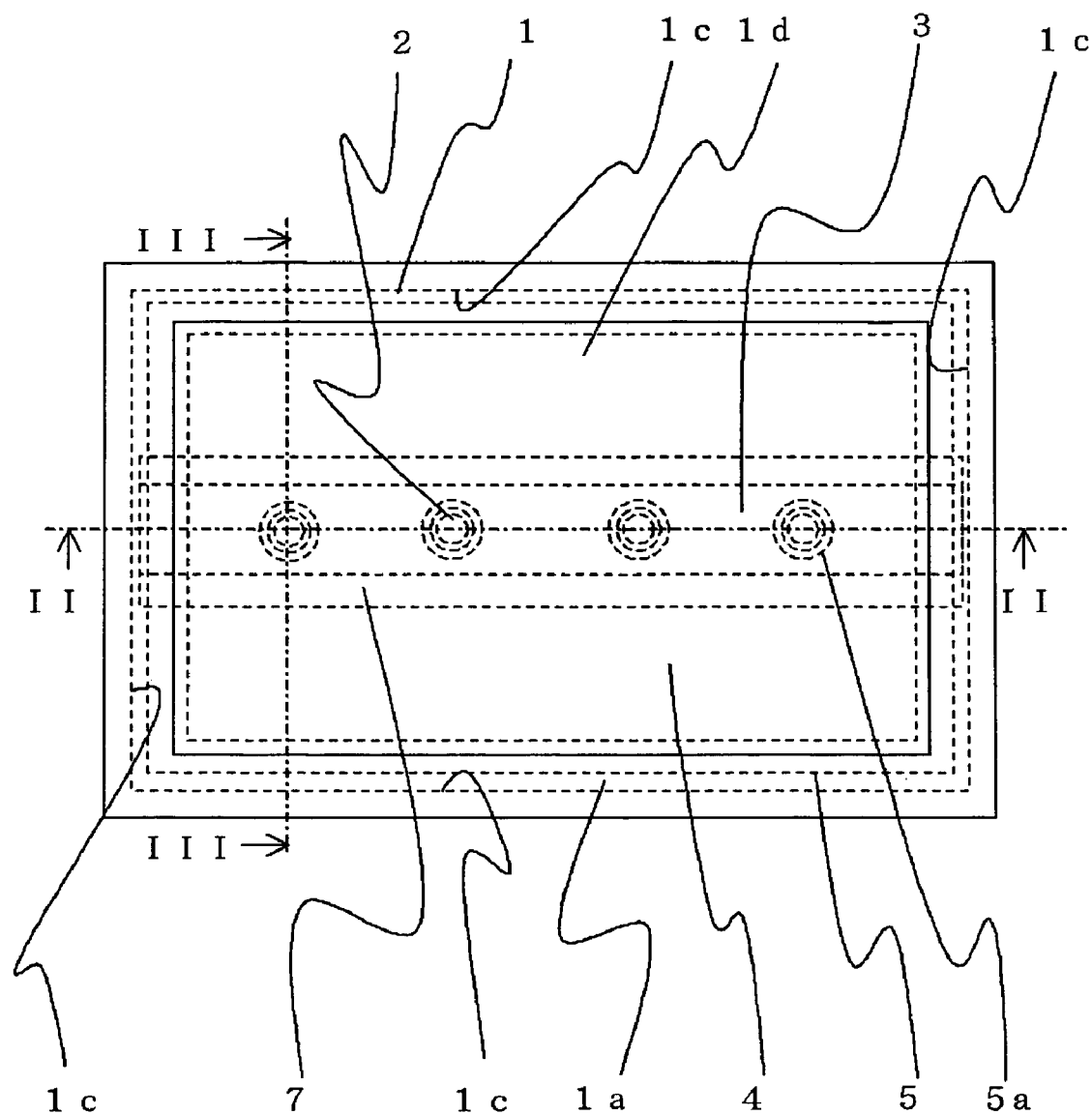
FIG. 1 is a plan view schematically illustrating the structure of a planar light-source device according to Embodiment 1 of the present invention.
Figure 2:
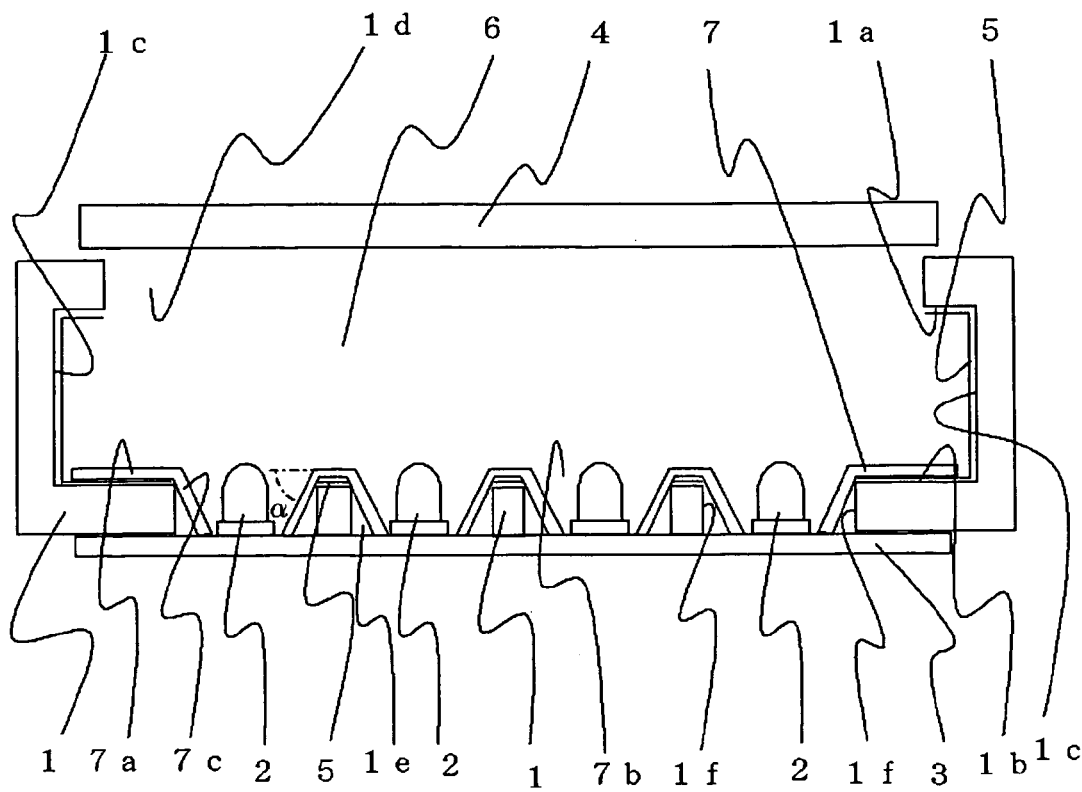
FIG. 2 is a partial cross-sectional view, taken along the line II-II indicated by the arrows, of the planar light-source device illustrated in FIG. 1.
Figure 3:
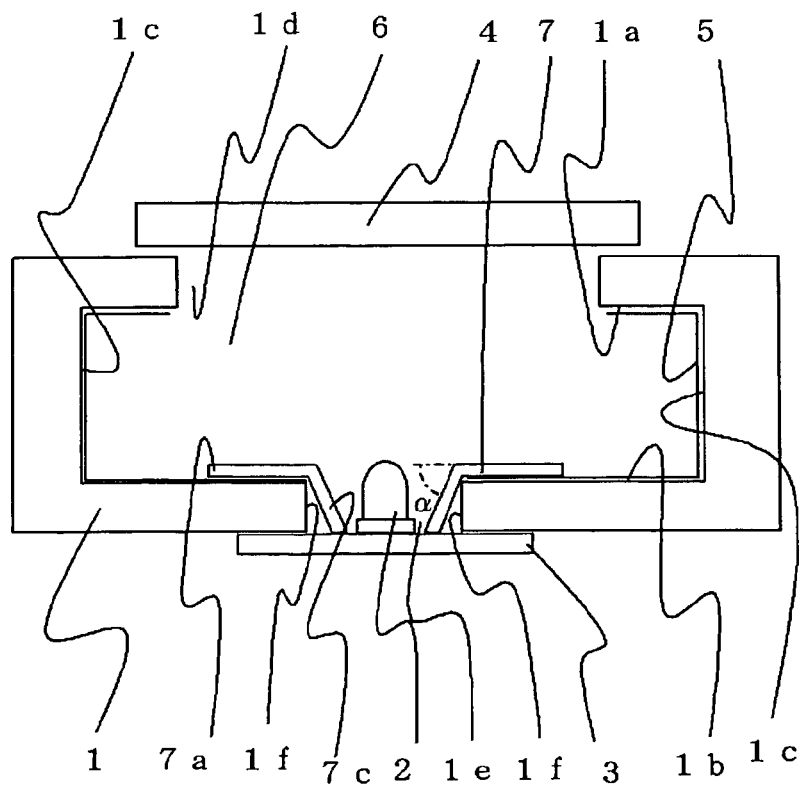
FIG. 3 is a partial cross-sectional view, taken along the line III-III indicated by the arrows, of the planar light-source device illustrated in FIG. 1.
Figure 8:
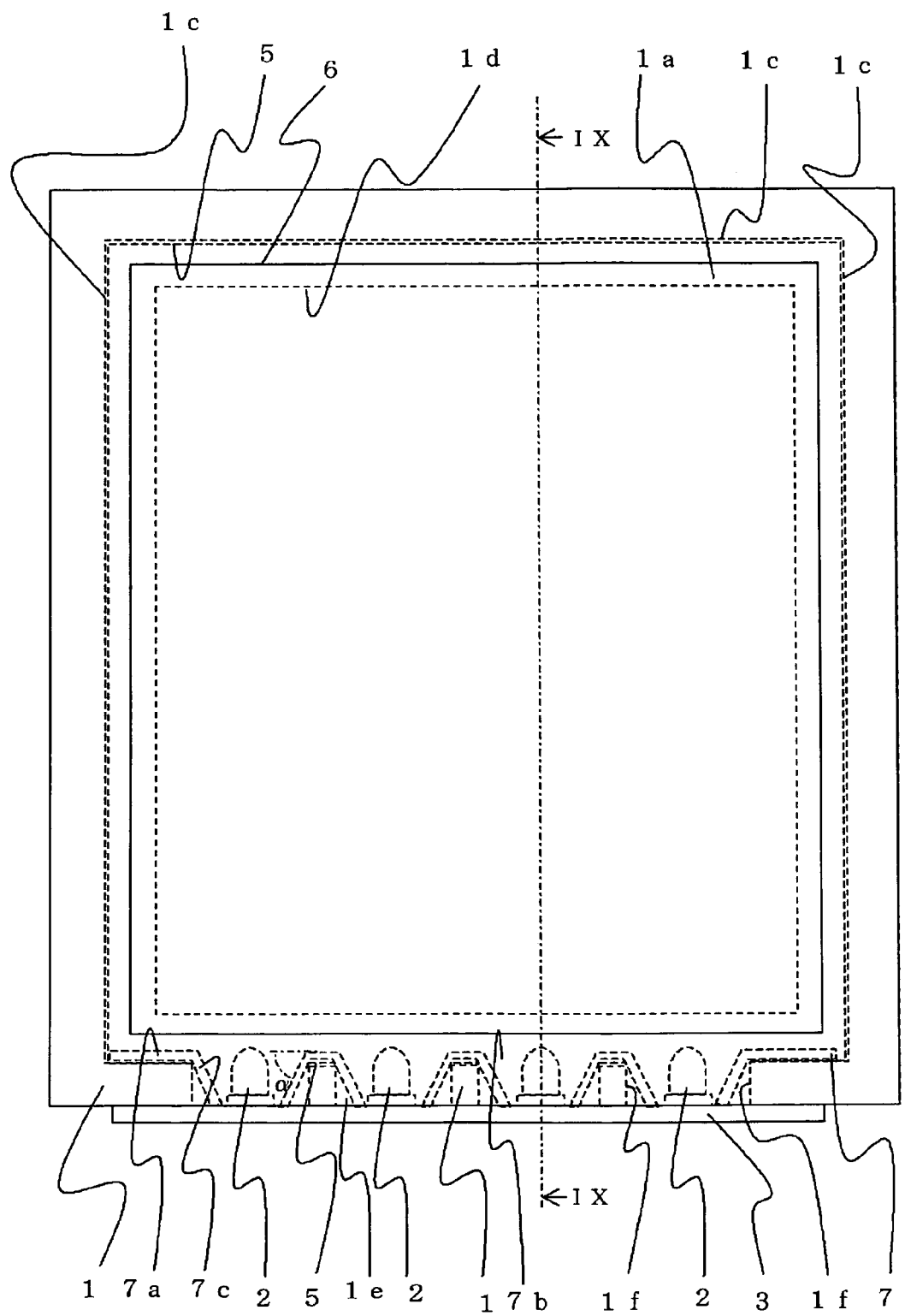
FIG. 8 is a plan view schematically illustrating the structure of another planar light-source device according to the present invention.
Figure 9:
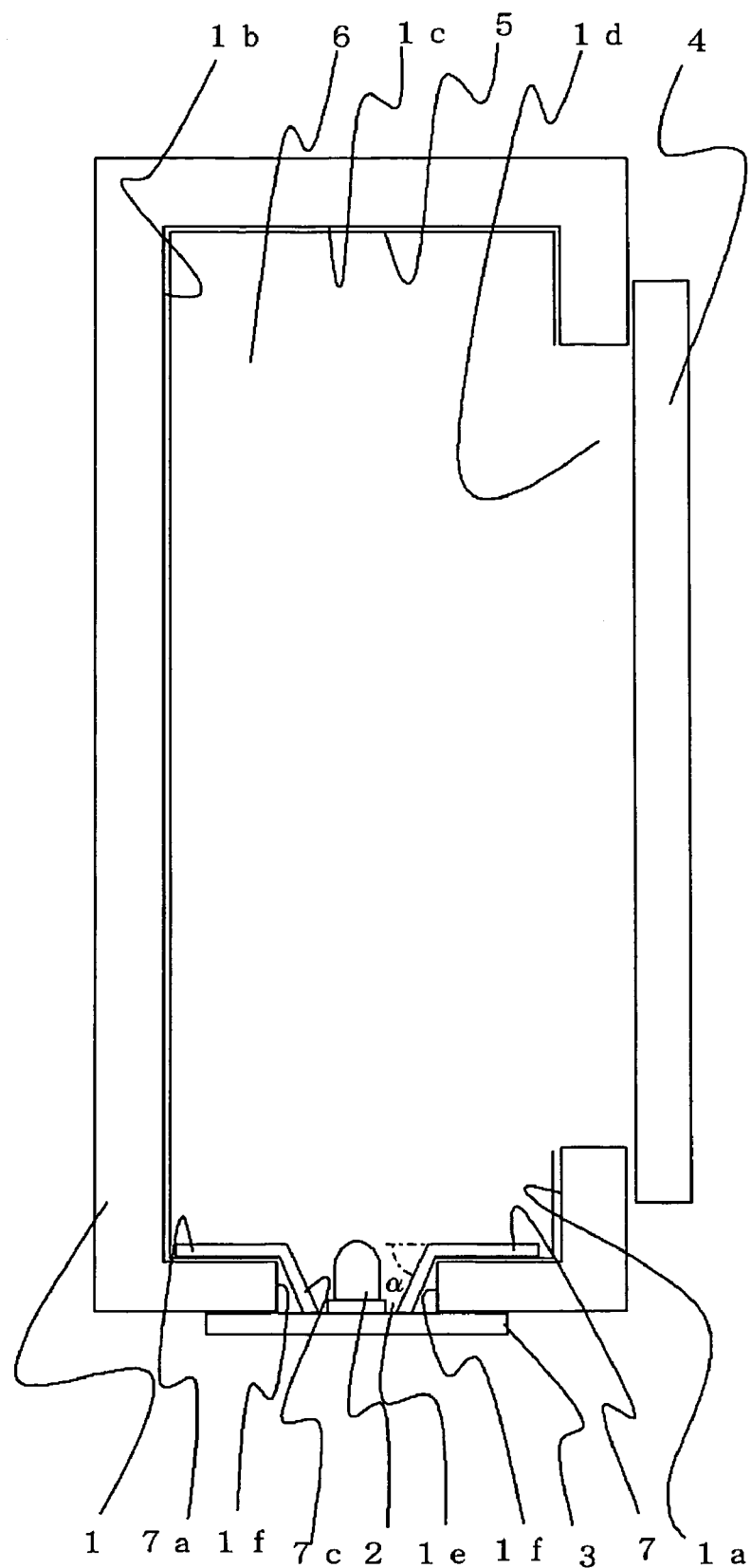
FIG. 9 is a partial cross-sectional view, taken along the line IX-IX indicated by the arrows, of the planar light-source device illustrated in FIG. 8.

FIG. 1 is a plan view schematically illustrating the structure of a planar light-source device according to Embodiment 1 of the present invention;

FIG. 2 is a partial cross-sectional view, taken along the line II-II indicated by the arrows, of the planar light-source device illustrated in FIG. 1;

FIG. 3 is a partial cross-sectional view, taken along the line III-III indicated by the arrows, of the planar light-source device illustrated in FIG. 1;

FIG. 4(a) is a plan view illustrating another shape of an oblique portion of a reflector;

FIG. 4(b) is a partial cross-sectional view, taken along the line A-A indicated by the arrows, of the oblique portion illustrated in FIG. 4(a);

FIG. 4(c) is a partial cross-sectional view, taken along the line B-B indicated by the arrows, of the oblique portion illustrated in FIG. 4(a);

FIG. 5(a) is a plan view illustrating another shape of an oblique portion of a reflector;

FIG. 5(b) is a partial cross-sectional view, taken along the line C-C indicated by the arrows, of the oblique portion illustrated in FIG. 5(a);

FIG. 5(c) is a partial cross-sectional view, taken along the line D-D indicated by the arrows, of the oblique portion illustrated in FIG. 5(a);

FIG. 6(a) is a plan view illustrating another shape of an oblique portion of a reflector;

FIG. 6(b) is a partial cross-sectional view, taken along the line E-E indicated by the arrows, of the oblique portion illustrated in FIG. 6(a);

FIG. 6(c) is a partial cross-sectional view, taken along the line F-F indicated by the arrows, of the oblique portion illustrated in FIG. 6(a);

FIG. 7(a) is a plan view illustrating an example of a reflector;

FIG. 7(b) is a plan view illustrating another example of a reflector;

FIG. 7(c) is a plan view illustrating further another example of a reflector;

FIG. 8 is a plan view schematically illustrating the structure of another planar light-source device according to the present invention; and FIG. 9 is a partial cross-sectional view, taken along the line IX-IX indicated by the arrows, of the planar light-source device illustrated in FIG. 8.

In FIGS. 1 to 9, a case 1 of the planar light-source device is formed of a top side 1a, bottom side 1b, and four wall sides 1c; an opening 1d exists in the top side 1a.

In order to be arranged along the bottom side 1b, point light sources 2 described later are disposed from the outside of the case 1, through a through-hole 1e formed in the bottom side 1b of the case 1. In addition, the case 1 is made of a metal such as aluminum or stainless steel, or plastic and may be formed as a single member, or, as may be necessary, configured of a plurality of integrated members.

As the light source, point light sources such as a light emitting diode (referred to as an LED, hereinafter) and a laser diode (LD) are enumerated. LEDs include a red LED that luminesces red-color (R) light, a green LED that luminesces green-color (G) light, and a blue LED that luminesces blue-color (B) light; by mixing R, G, and B, white-color light can also be obtained.

The point light sources 2, in accordance with the application, selected from or configured of light emitting diodes, or the like, that emit light of a red color, a green color, a blue color, or an intermediate color among those colors or a white color, respectively, are mounted on a light-source substrate 3.

In addition, in Embodiment 1, as the point light source 2, a white-color LED is utilized that is formed of a semiconductor light-emitting element that luminesces homogeneous blue-color light and a phosphor that absorbs part of the blue-color light radiated from the semiconductor light-emitting element and radiates yellow-color light; however, the point light source 2 is not limited to a white-color LED.

Additionally, on the light-source substrate 3, a plurality of point light sources 2 is mounted spaced the same distance apart from one another, along the longitudinal direction of the light-source substrate 3, whereby the point light sources 2 are positioned through the light-source substrate 3.

The light-source substrate 3 is installed approximately in parallel, from the outside of the bottom side 1b, whereby the light sources 2 are provided in such a way as to pass through the through-holes 1e provided in the bottom side 1b of the case 1 and to be in a row along the inside of the bottom side 1b. Additionally, the point light sources 2 are also electrically connected to the light-source substrate 3, whereby external electrical signals are forwarded through the light-source substrate 3 to the point light sources 2.

A diffusion plate 4 is arranged over the opening 1d of the case 1.

The diffusion plate 4 is formed of a material that has a light-transmission function, such as a glass substrate or a resin plate such as a polyethylene terephthalate (PET), a polymethyl methacrylate (PMMA), or a polycarbonate (PC). In addition, it is preferable to utilize as the diffusion plate 4 a material to which a reflective material is mixed, or whose surface is roughened, thereby providing the diffusion plate 4 with a function of diffusing of incident light. That is because, as a result, a planar light-source device having a wide directivity can be obtained.

A reflection sheet 5 is arranged on the top side 1a, the bottom side 1b, and the wall sides 1c, which are the inside surfaces of the case 1, so that light does not leak from the case 1, but proceeds to the opening 1d after being reflected inside the case. By forming a hollow region 6 between the reflection sheet 5 and the diffusion plate 4, the light propagates through the air existing within the hollow region 6.

The reflection sheet 5 is formed of a mixture of a PP (polypropylene) or a PET (polyethylene terephthalate) and a barium sulfate or a titanium oxide, a resin having microscopic air bubbles, a silver-plated metal plate, or a metal plate coated with a paint including a titanium oxide.

In addition, it is preferable that the reflectance of the reflection sheet 5 is 90% or higher so that the reflection loss at the reflection surface is suppressed. Additionally, it is preferable to raise the reflectance of the inner surface of the case 1, for example, by whiten the inner surface of the case 1. That is because the reflection on the inner surface of the case 1 is further enhanced, whereby loss of light is reduced. Additionally, it is preferable to make the case 1 play the role of the reflection sheet 5. That is because the number of members can be reduced.

In addition, in the reflection sheet 5 arranged on the bottom side 1b of the case 1, a through-hole 5a is formed in such a way as to correspond to the through-hole 1e formed in the bottom side of the case 1. The light-source substrate 3 is disposed from the outside onto the bottom side 1b of the case 1; through a through-hole 1e of the case 1 and the through-hole 5a of the reflection sheet, the point light sources 2 are arranged on the bottom side 1b from the outside onto the inside of the case 1.

Reflectors 7 are arranged on the reflection sheet 5, corresponding to the respective point light sources 2. The reflector 7 is slanted from the bottom side 1b of the case 1 toward the deep of the through-hole 1e in a region surrounded by the peripheral portion 1f of the through-hole 1e of the case 1 and the point light source 2. In other words, the reflector 7 is formed of a flat portion 7a supported on the reflection sheet 5 and an oblique portion 7c having a through-hole 7b, defined by the periphery thereof, for inserting the point light source 2.

In addition, as processing methods of forming the oblique portion 7c in the reflector 7, a plasticity process such as a spinning process, and a bending process can be enumerated. In the bending processing, because a cutting portion for bending the flat portion 7a to create the oblique portion 7c is required, light emitted from the point light source 2 may leak from the cutting portion side to the peripheral portion 1f side. However, because no cutting portion exists therein, whereby light leakage does not occur, the spinning process is preferable.

On the diffusion plate 4, a group of unillustrated optical sheets for effectively utilizing light is arranged; an unillustrated liquid-crystal display element is arranged through the group of optical sheets on the diffusion plate 4.

In addition, the group of optical sheets is configured of a lens sheet sandwiched between diffusion sheets. Moreover, when the enhancement of brightness is required, a plurality of lens sheets may be combined, with the orientation of prisms formed on each of the lens sheets being considered. Still moreover, in the case where diffusibility is raised, two or more diffusion sheets may be utilized. Furthermore, depending on the light-distribution characteristics of the lens sheet, only one lens sheet may be utilized, or no lens sheet may be utilized. Moreover, a protection sheet, a lens sheet, and a polarization-reflection sheet may be combined. Still moreover, no optical sheet may be utilized; it is preferable to implement optimization, with required brightness and light-distribution characteristics being considered.

As a display unit disposed on the planar-light-source device, a liquid-crystal display element that utilizes the birefringence property of a liquid crystal, a print obtained by printing characters and pictures on a transparent plate, and the like are enumerated; in Embodiment 1, as a display unit, a liquid crystal display element is utilized.

The liquid-crystal display element is made up of a TFT array substrate consisting of a colored layer, a light-cutoff layer, thin film transistors (referred to as TFTs, hereinafter) as switching elements, electrodes such as pixel electrodes, and conducting wires that are formed on an unillustrated upper or lower substrate, a facing substrate, spacers for holding the two substrates evenly spaced apart, a seal adhesive for sealing the two substrates, a sealing material for sealing a liquid crystal filled between the two substrates, an orientation film for providing the liquid crystal with initial orientation, a polarizing plate for polarizing light, and the like; however, explanation for the foregoing constituent elements will be omitted because existing liquid crystal display elements are utilized in the present invention.

The case 1 is structured in such a way as to, being combined with an unillustrated front frame, contain the liquid-crystal display element that forms an image, based on an in-bound video signal, and an unillustrated circuit that is arranged in the vicinity of the liquid-crystal display element and drives the liquid-crystal display element. The circuit is structured in such a way that an IC chip is mounted on a flexible board that is in general connected with the liquid-crystal display element to drive the liquid-crystal display element, or directly on the liquid-crystal display element; as may be necessary, a circuit board is further arranged around the flexible board and the liquid-crystal display element. In addition, in general, the front frame is formed of a metal such as aluminum or stainless steel.

As described above, by providing an unillustrated circuit that drives the liquid-crystal display element and arranging the liquid-crystal display element on the planar light-source device, a liquid-crystal display device is configured.

Next, a light path, in which a ray is emitted by the point light source 2 and exits from the diffusing plate 4, will be discussed.

Part of rays emitted by the point light source 2 on the light-source substrate 3 are led through the hollow region 6 to the diffusion plate 4. Part of the rest rays are reflected by the oblique portion 7c of the reflector 7, propagate through the hollow region 6, and are led to the diffusion plate 4. Further, another part of the rest rays are reflected by the reflection sheet 5 arranged on the top side 1a, the bottom side 1b, and the wall side 1c, of the case 1, and the flat portion 7a of the reflector 7 arranged on the bottom side 1b of the case 1, propagate through the hollow region 6, and are led to the diffusion plate 4.

In this situation, in the case where the reflector 7 is not arranged on the reflection sheet 5, and the thickness of the pedestal on which the point light source 2 on the light-source substrate 3 is disposed is smaller than that of the bottom side 1b of the case 1, other than rays, among rays emitted by the point light source 2, that directly propagate into the hollow region 6, rays exist that, in the space between the point light source 2 and the peripheral portion 1f of the through-hole 1e in the case 1, leaks into or is absorbed into a space outside the hollow region 6, whereby the number of rays that propagate into the hollow region 6 is reduced. In consequence, deterioration in the luminance or display performance of the liquid-crystal display device has been a problem.

In contrast, by arranging the foregoing reflector 7 on the reflection sheet 5, rays emitted by the point light source 2 can be reflected by the oblique portion 7a of the reflector 7, toward the hollow region 6; therefore, the diffused reflection and the absorption of the rays at the peripheral portion 1f of the through-hole 1e do not occur, whereby a planar light-source device can be obtained in which loss of rays emitted by the point light source 2 is reduced, and light-utilization efficiency is raised.

Rays that enter the diffusion plate 4 are divided into light components that pass through the diffusion plate 4 and light components that are reflected by particles within the diffusion plate 4. Out of the light components, the light components that have been reflected toward the light source are regularly or diffusively reflected by the reflection sheet 5 or the reflector 7, or reflected in a fashion in which the regular reflection and the diffusive reflection are combined, and enter the diffusion plate 4 again. Meanwhile, the light components that have entered the diffusion plate 4 are emitted evenly in all directions from the surface of the diffusion plate 4.

Light emitted from the opening 1d of the case 1 passes through the group of optical sheets formed of diffusion sheets, protection sheets, and lens sheets and enters the liquid-crystal display element. With its liquid-crystal layer oriented through ON/OFF-change of voltage by an unillustrated switching element, the liquid-crystal display element modulates the incident light in accordance with a video signal to display a red color, a green color, or a blue color.

In addition, in Embodiment 1, the shape of the through-hole 7b in the reflector 7 is made circular, corresponding to the circular shape, i.e., the shape of the point light source 2 when viewed from above; however, as illustrated in FIG. 4, the shape of the through-hole 7b may be a polygonal shape such as a rectangle. Accordingly, for example, in the case where the shape of the point light source 2 is a polygonal shape such as a rectangle, it is preferable to make the shape of the through-hole 7b in the reflector 7 rectangular, in accordance with the shape of the point light source 2. That is because the space between the point light source 2 and the reflector 7 is reduced, whereby leakage of light emitted by the point light source 2 can be decreased.

Additionally, it is preferable that, as illustrated in FIGS. 2, 3, and 4(b), the angle α between the flat portion 7a of the reflector 7 and the oblique portion 7c is between 0° and 90° so that the light emitted from the point light source 2 is reflected by the oblique portion 7c, toward the hollow region 6.

In FIGS. 2 to 4, the oblique portion 7c is formed in the reflector 7 in such a way as to surround the vicinity of the point light source 2; however, by forming the semicircular oblique portion 7c around the circular through-hole 7b as illustrated in FIG. 5, or by forming oblique portion 7c only on the one side of the square through-hole 7b as illustrated in FIG. 6, rays that leak into or are absorbed into a space outside the hollow region 6 can also be reduced.

In particular, as illustrated in FIG. 7, by forming the oblique portion 7c illustrated in FIG. 5 or FIG. 6 at the edge, of each through-hole 7b in the reflector 7, closer to a transverse side of the reflector 7 on the same side, with respect to the middle of the reflector 7, and applying the resultant oblique portions 7c to the reflector 7 of the planar light-source device illustrated in FIG. 1, rays emitted from the point light source 2 can be condensed through the oblique portions 7c of the reflector 7 to the center of the opening 1d in the case 1.

The foregoing method is preferable, because, in a planar light-source device that has to meet the requirement of high brightness in the middle of the screen, the brightness in the middle portion thereof can be raised.

Moreover, as illustrated in FIG. 7(a), by forming a plurality of oblique portions 7c, illustrated in FIG. 5 or FIG. 6, in the reflector 7, in such a way that the faces of the oblique portions 7c on the one side of the reflector 7 oppose the faces of the oblique portions 7c on the other side of the reflector 7, symmetrically with respect to the longitudinal center axis of the reflector 7, and by applying the oblique portions 7c to the reflector 7 of the planar light-source device illustrated in FIG. 1, rays emitted from the point light source 2 can be condensed through the oblique portions 7c of the reflector 7 to the area outside the middle portion of the opening 1d in the case 1.

As described above, by, depending on the light-distribution characteristics of the point light source 2, appropriately and arbitrarily setting the formation position for the oblique portion 7c of the reflector 7, the gradient angle α between the oblique portion 7c and the flat portion 7a of the reflector 7, or the area of the oblique portion 7c, the luminance distribution within the display screen can be optimized, whereby desired luminance distribution can be obtained.

Still moreover, in the case where, as the point light source 2, a red-color LED, a green-color LED, or a blue-color LED is utilized, by arbitrarily setting the formation position for the oblique portion 7c of the reflector 7, the gradient angle α between the oblique portion 7c and the flat portion 7a of the reflector 7, or the area of the oblique portion 7c, the chromaticity distribution within the display screen can be optimized, whereby desired chromaticity distribution can be obtained.

In addition, in Embodiment 1, as illustrated in FIG. 1, the light-source substrate 3 is arranged in parallel with the longitudinal side of the bottom side 1b of the case 1 and on the line obtained by connecting the respective middle points of both transverse sides of the bottom side 1b; however, in accordance with a required product specification and optical characteristics, the arrangement positions, the alignment direction, or the number of rows, of the point light sources are arbitrarily selected.

In the planar light-source device illustrated in FIG. 1, the luminances of portions, of the opening 1d of the case 1, that are immediately above the point light sources 2 are higher than those of other portions.

In this situation, unillustrated reflection members having light reflectiveness are arranged at the positions, above the point light sources 2, within the hollow portion 6. Accordingly, by making rays that, from the point light sources 2, are emitted straight up to be reflected by the reflection members toward the bottom side 1b, thereby suppressing rays that directly reach the opening 1d of the case 1, a luminance distribution that is uniform within the display screen can be obtained.

Moreover, as illustrated in FIGS. 8 and 9, by arranging the light-source substrate 3 on one of the wall sides 1c of the case 1, rays that are emitted straight up from the point light sources 2 can be radiated to the wall side 1c opposing the one of the wall sides 1c on which the point light sources are arranged; therefore, rays that reach the opening 1d of the case 1 can be suppressed, whereby a luminance distribution that is uniform within the display screen can be obtained.

In addition, by, as illustrated in FIG. 7(c), forming the oblique portion 7c at the edge, of each through-hole 7b in the reflector 7, in such a way that the oblique portion 7c faces one of the longitudinal sides of the reflector 7, and applying the resultant oblique portions 7c to the reflector 7 of the planar light-source device illustrated in FIGS. 8 and 9, in such a way that the oblique portions 7c faces the top side 1a of the case 1, rays emitted from the point light sources 2 can be condensed through the oblique portions 7c of the reflector 7 toward the top side 1a of the case 1.

Moreover, by applying the oblique portions 7c as illustrated in FIG. 7(c) to the reflector 7 of the planar light-source device illustrated in FIGS. 8 and 9, in such a way that the oblique portions 7c are formed on the semicircles, of the through-holes 7b, that are closer to the top side 1a of the case 1 than the other semicircles, and that the faces of the oblique portions 7c are oriented toward the bottom side 1b, rays emitted from the point light sources 2 can be condensed through the oblique portions 7c of the reflector 7 toward the bottom side 1b of the case 1.

Embodiment 2

Figure 10:
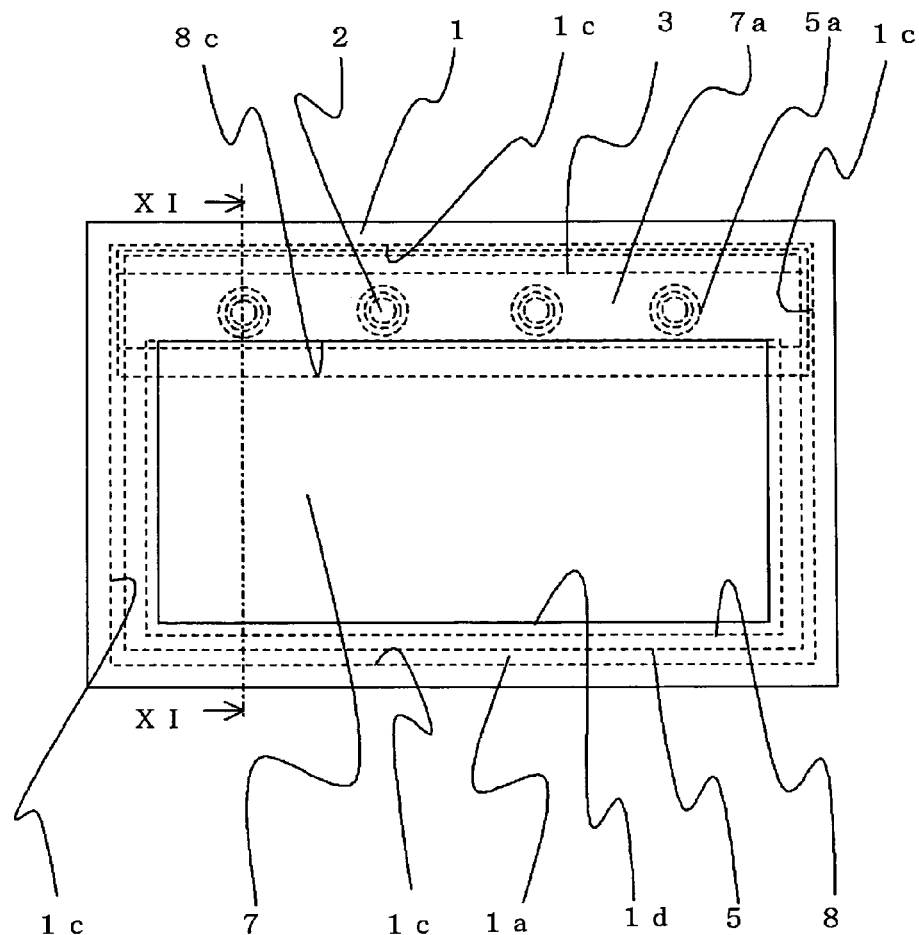
FIG. 10 is a plan view schematically illustrating the structure of a planar light-source device according to Embodiment 2 of the present invention.
Figure 11:
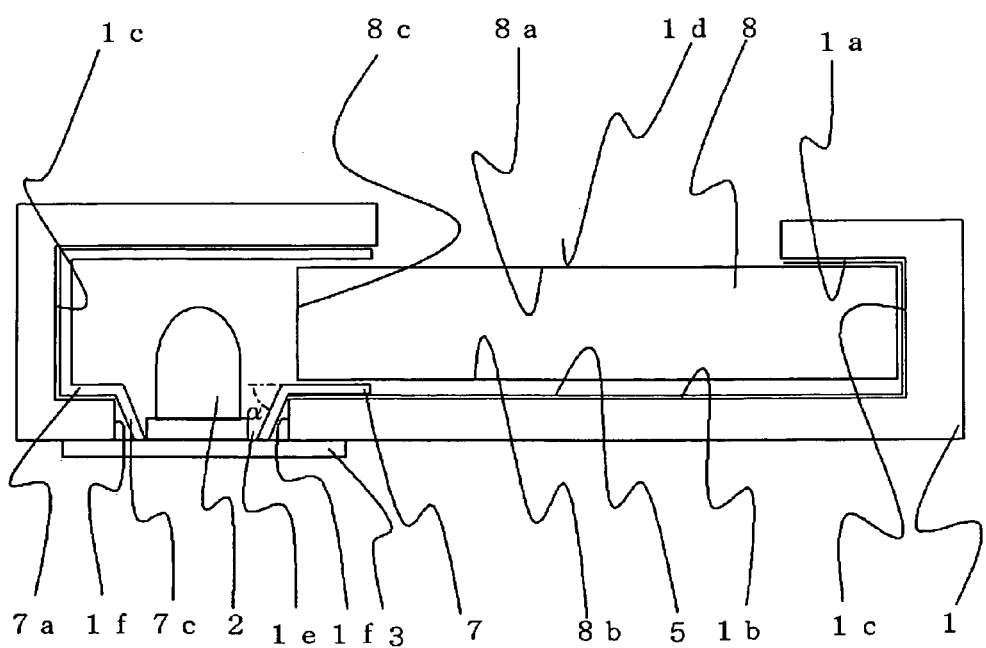
FIG. 11 is a partial cross-sectional view, taken along the line XI-XI indicated by the arrows, of the planar light-source device illustrated in FIG. 10.
Figure 12:
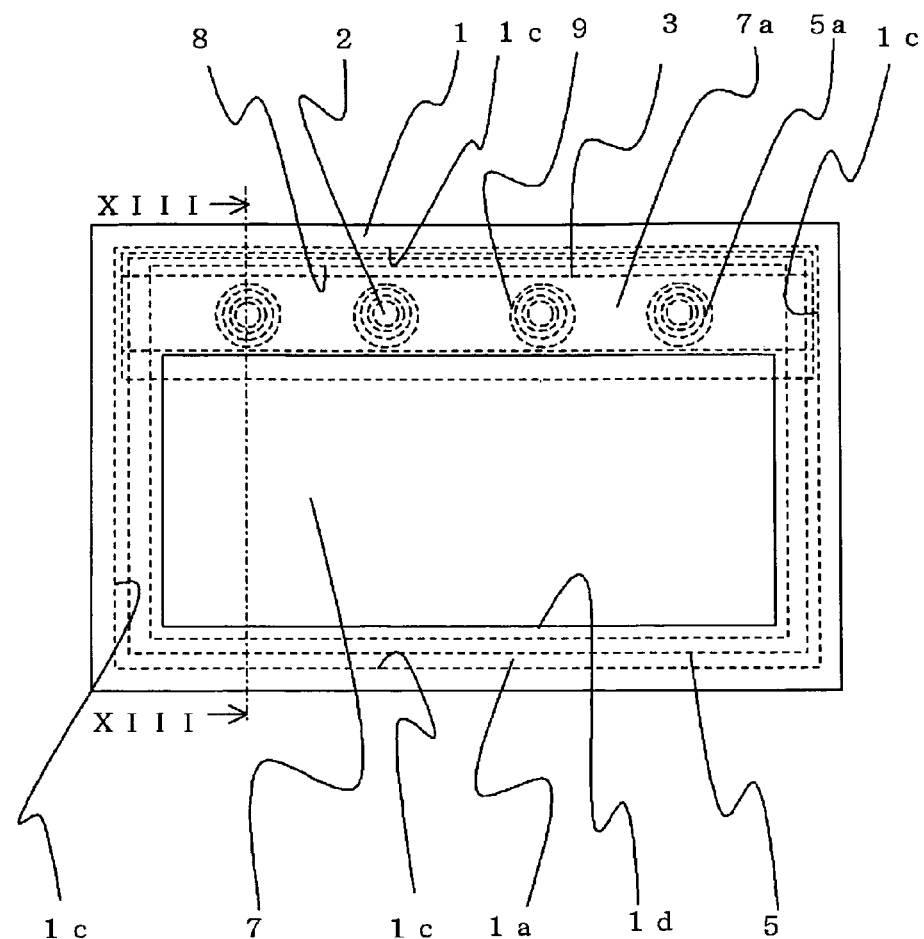
FIG. 12 is a plan view schematically illustrating the structure of another planar light-source device according to the present invention.
Figure 13:
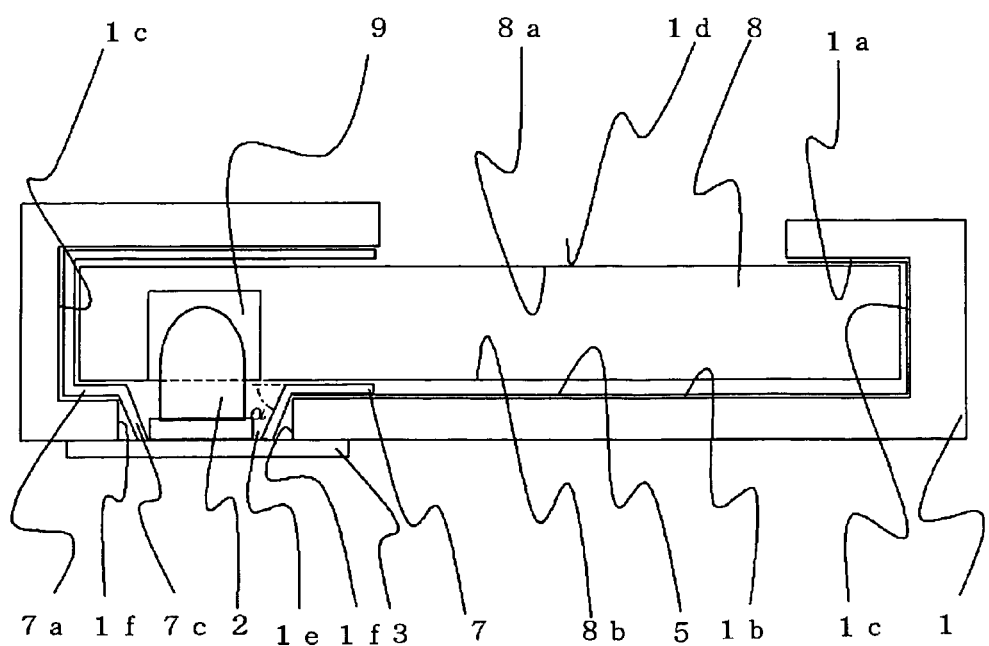
FIG. 13 is a partial cross-sectional view, taken along the line XIII-XIII indicated by the arrows, of the planar light-source device illustrated in FIG. 12.
Figure 14:
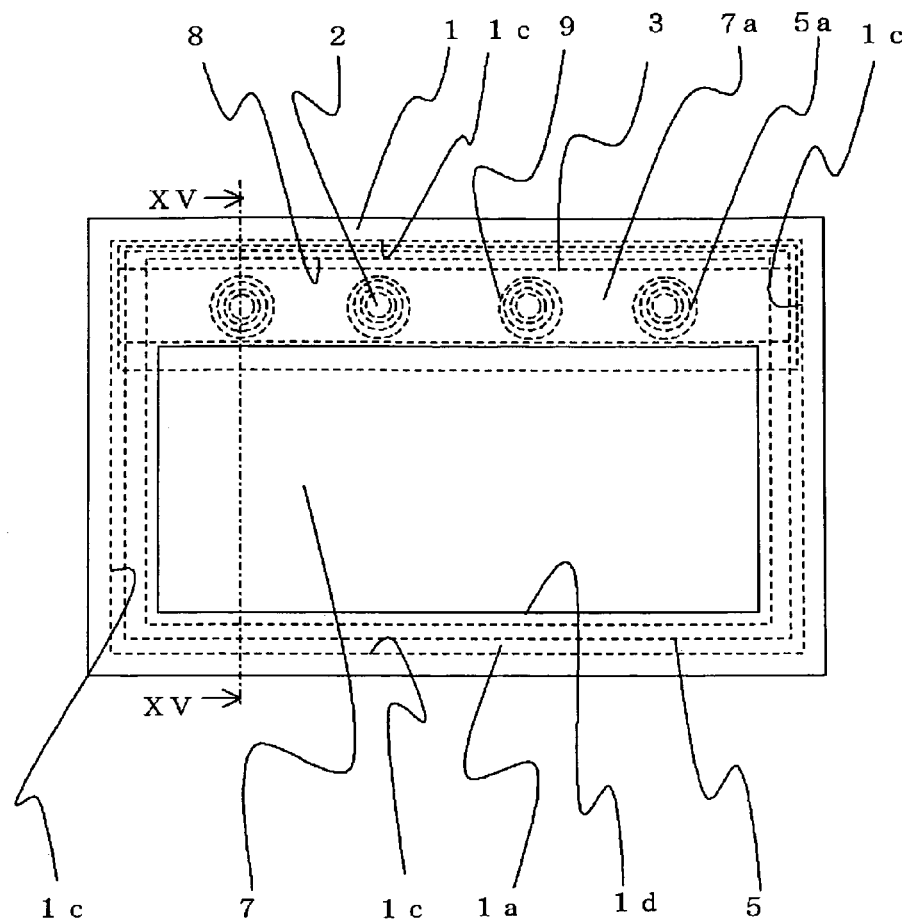
FIG. 14 is a plan view schematically illustrating the structure of further another planar light-source device according to the present invention.
Figure 15:
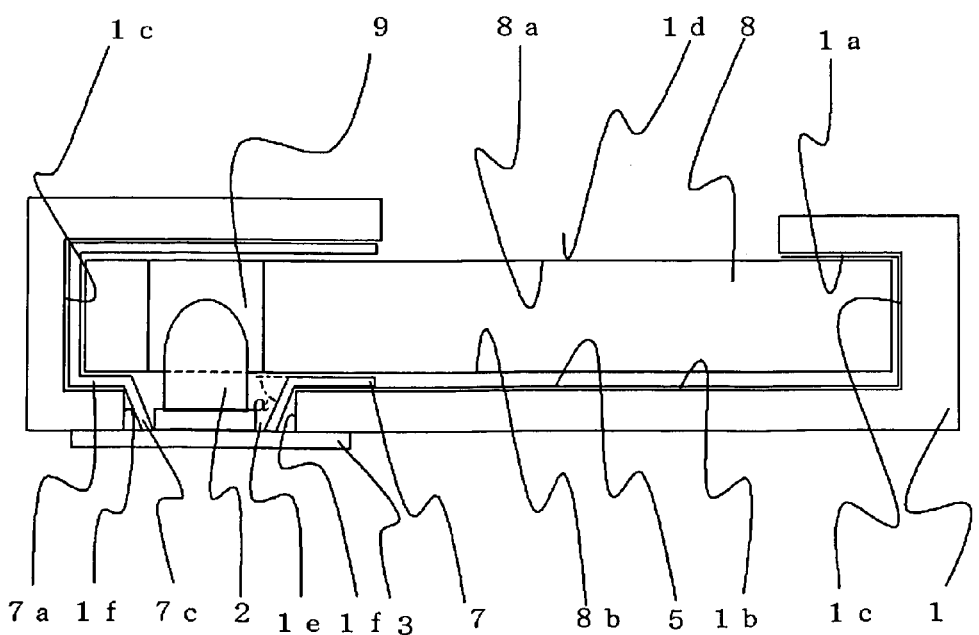
FIG. 15 is a partial cross-sectional view, taken along the line XV-XV indicated by the arrows, of the planar light-source device illustrated in FIG. 14.

FIG. 10 is a plan view schematically illustrating the structure of a planar light-source device according to Embodiment 2 of the present invention; FIG. 11 is a partial cross-sectional view, taken along the line XI-XI indicated by the arrows, of the planar light-source device illustrated in FIG. 10; FIG. 12 is a plan view schematically illustrating the structure of another planar light-source device according to the present invention; FIG. 13 is a partial cross-sectional view, taken along the line XIII-XIII indicated by the arrows, of the planar light-source device illustrated in FIG. 12; FIG. 14 is a plan view schematically illustrating the structure of further another planar light-source device according to the present invention; and FIG. 15 is a partial cross-sectional view, taken along the line XV-XV indicated by the arrows, of the planar light-source device illustrated in FIG. 14. In FIGS. 10 to 15, the same reference marks as those in FIGS. 1 to 9 designate the same or equivalent constituent elements, and explanations therefor will be omitted.

As illustrated in FIGS. 10 and 11, the light-source substrate is arranged on the outer face of the bottom side 1b of the case 1.

A light guide plate 8 that transmits light from the point light source 2 to opening 1d is arranged on the opening 1d side of the reflection sheet 5 inside the case 1. The light guide plate 8 is formed of a material that has a light-transmission function and has a refraction index of 1.4 to 1.6, such as a glass substrate or a resin plate such as a polyethylene terephthalate (PET), a polymethyl methacrylate (PMMA), or a polycarbonate (PC).

On the light guide plate 8, the foregoing group of optical sheets for effectively utilizing light is arranged; the foregoing liquid-crystal display element is arranged on the light guide plate 8, through the group of optical sheets.

Next, a light path, in which a ray emitted by the point light source 2 exits from the top surface 8a of the light guide plate 8 and enters the liquid-crystal display element, will be explained.

The ray emitted by the point light source 2 enters the incident face 8c of the light guide plate 8, directly or after being reflected by the reflector 7.

The ray that has entered the light guide plate 8 propagates inside the incident light guide plate 8, while repeating total reflection at the boundary between the light guide plate 8 and the air layer. By making the ray that propagates inside the light guide plate 8 to be diffusively reflected through an unillustrated diffusion pattern provided on a portion, of the bottom side 8b of the light guide plate 8, that corresponds to the opening 1d of the case 1, thereby changing the propagation direction of the ray, the ray is enabled to enter the top side 8a of the light guide plate 8, at an incident angle less than the critical angle, with respect to the boundary between the light guide plate 8 and the air layer, whereby the ray exits from the opening 1d, of the case 1, where no reflection sheet exists.

In addition, part of the rays exit from the sides, other than the top side 8a, among the sides of the light guide plate 8; however, being reflected by the reflection sheet 5 arranged on the bottom side 1b, the top side 1a, and the wall sides 1c of the case 1, the part of the rays reenter the light guide plate 8 and exit from the top side 8a of the light guide plate 8.

The ray emitted from the opening 1d of the case 1 passes through the group of optical sheets formed of diffusion sheets, protection sheets, and lens sheets, and enters the liquid-crystal display element. With its liquid-crystal layer oriented through ON/OFF-change of voltage by a switching element, the liquid-crystal display element modulates the incident light in accordance with a video signal to display a red color, a green color, or a blue color.

In addition, the planar light-source device, illustrated in FIGS. 10 and 11, in Embodiment 2 is the same as that in Embodiment 1, except that, instead of arranging the diffusion plate 4 in the entire opening 1d of the case 1, the light guide plate 8 is arranged in the hollow region 6, and demonstrates the same operation and effect as those of Embodiment 1.

Moreover, in the planar light-source device, illustrated in FIGS. 10 and 11, in Embodiment 2, the point light source 2 is arranged in the vicinity of the incident face 8c of the light guide plate 8; however, as illustrated in FIGS. 12 and 13, the point light source 2 may be contained in a recess 9 formed in the bottom side 8b of the light guide plate 8. Still moreover, as illustrated in FIGS. 14 and 15, the point light source 2 may be contained in the recess 9 that is formed not only in the bottom side 8b of the light guide plate 8, but also in such a way as to penetrate the light guide plate 8 and reach the opening 1d of the case 1.

Accordingly, in a process in which rays emitted from the point light source 2 enter the light guide plate 8, without being recurrently reflected by the reflector 7, most part of the rays emitted from the point light source 2 can enter the light guide plate 8 through the recess 9 of the light guide plate 8; therefore, compared with the foregoing case where the point light source 2 is arranged in the vicinity of the incident face 8c of the light guide plate 8, light-utilization efficiency can be enhanced.

What is claimed is:

1. A planar light-source device comprising:
   a case having an opening;
   a diffusion plate arranged over the opening;
   a reflection sheet arranged inside the case to form a hollow region enclosed by the diffusion plate and the reflection sheet;
   a point light source arranged along the bottom side or a wall side of the case; and
   a reflector arranged on the reflection sheet to correspond to the point light source, wherein the point light source is installed from outside the case, through a through-hole formed in the case and the reflection sheet, and in a region enclosed by the peripheral portion of the through-hole and by the point light source, the reflector is slanted with respect to the bottom side or the wall side of the case, depthward along the through-hole.

2. A planar light-source device comprising:
   a case having an opening;
   a reflection sheet arranged inside the case;
   a light guide plate arranged within the case to correspond to the opening;
   a point light source arranged along the bottom side or a wall side of the case; and
   a reflector arranged on the reflection sheet to correspond to the point light source, wherein the point light source is installed from outside the case, through a through-hole formed in the case and the reflection sheet, and in a region enclosed by the peripheral portion of the through-hole and by the point light source, the reflector is slanted with respect to the bottom side or the wall side of the case, depthward along the through-hole.

3. The planar light-source device according to claim 1, wherein the reflector is arranged on the bottom side of the case, and a plurality of oblique portions that are slanted portions of the reflector is formed in such a way that the faces of the oblique portions on the one side of the reflector oppose the faces of the oblique portions on the other side of the reflector, symmetrically with respect to the longitudinal center axis of the reflector.

4. The planar light-source device according to claim 2, wherein the reflector is arranged on the bottom side of the case, and a plurality of oblique portions that are slanted portions of the reflector is formed in such a way that the faces of the oblique portions on the one side of the reflector oppose the faces of the oblique portions on the other side of the reflector, symmetrically with respect to the longitudinal center axis of the reflector.

5. The planar light-source device according to claim 1, wherein the reflector is arranged on the bottom side of the case, and a plurality of oblique portions that are slanted portions of the reflector is formed in such a way that the faces of the oblique portions on the one side of the reflector and the faces of the oblique portions on the other side of the reflector are oriented to the opposite directions, symmetrically with respect to the longitudinal center axis of the reflector.

6. The planar light-source device according to claim 1, wherein the reflector is arranged on one of the wall sides of the case, and a plurality of oblique portions that are slanted portions of the reflector is formed in such a way that the faces of the oblique portions are oriented toward one of the longitudinal side lines of the reflector and the oblique portions are oriented toward the top side of the case.

7. The planar light-source device according to claim 2, wherein the reflector is arranged on the bottom side of the case, and a plurality of oblique portions that are slanted portions of the reflector is formed in such a way that the faces of the oblique portions on the one side of the reflector and the faces of the oblique portions on the other side of the reflector are oriented to the opposite directions, symmetrically with respect to the longitudinal center axis of the reflector.

8. The planar light-source device according to claim 2, wherein the reflector is arranged on one of the wall sides of the case, and a plurality of oblique portions that are slanted portions of the reflector is formed in such a way that the faces of the oblique portions are oriented toward one of the longitudinal side lines of the reflector and the oblique portions are oriented toward the top side of the case.

9. The planar light-source device according to claim 1, wherein the reflector is arranged on one of the wall sides of the case, and a plurality of oblique portions that are slanted portions of the reflector is formed in such a way that the faces of the oblique portions are oriented toward one of the longitudinal side lines of the reflector and the oblique portions are oriented toward the bottom side of the case.

10. The planar light-source device according to claim 2, wherein the reflector is arranged on one of the wall sides of the case, and a plurality of oblique portions that are slanted portions of the reflector is formed in such a way that the faces of the oblique portions are oriented toward one of the longitudinal side lines of the reflector and the oblique portions are oriented toward the bottom side of the case.

11. The planar light-source device according to claim 2, wherein the light guide plate has a recess that contains the point light source.

12. The planar light-source device according to claim 11, wherein the recess of the light guide plate penetrates the light guide plate and reaches the opening of the case.

13. The planar light-source device according to claim 1, wherein the reflector is formed of a flat portion and an oblique portion, and the oblique portion is formed through spinning processing.

14. The planar light-source device according to claim 2, wherein the reflector is formed of a flat portion and an oblique portion, and the oblique portion is formed through spinning processing.

15. The planar light-source device according to claim 1, wherein the reflector is formed of a flat portion and an oblique portion, and the oblique portion is formed through bending processing.

16. The planar light-source device according to claim 2, wherein the reflector is formed of a flat portion and an oblique portion, and the oblique portion is formed through bending processing.

* * * * *